United States Patent
Satoh et al.

(10) Patent No.: US 7,864,474 B2
(45) Date of Patent: Jan. 4, 2011

(54) DISK DRIVE AND CONTROL METHOD THEREOF

(75) Inventors: Noriaki Satoh, Kanagawa (JP); Toyomi Ohsawa, Kanagawa (JP); Yumi Nagano, Kanagawa (JP); Kouji Miyake, Kanagawa (JP); Yoshiaki Uji, Tokyo (JP); Masayuki Kurita, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 518 days.

(21) Appl. No.: 11/789,866

(22) Filed: Apr. 25, 2007

(65) Prior Publication Data

US 2008/0247079 A1 Oct. 9, 2008

(30) Foreign Application Priority Data

Apr. 25, 2006 (JP) ............................. 2006-120688

(51) Int. Cl.
*G11B 5/02* (2006.01)
(52) U.S. Cl. ............................. 360/59; 360/31; 360/62
(58) Field of Classification Search ........................ None
See application file for complete search history.

(56) References Cited

U.S. PATENT DOCUMENTS

| | | | |
|---|---|---|---|
| 5,650,887 A * | 7/1997 | Dovek et al. ................... 360/75 |
| 5,991,113 A * | 11/1999 | Meyer et al. ................... 360/75 |
| 6,123,781 A * | 9/2000 | Shimazawa ................. 148/108 |
| 6,336,083 B1 * | 1/2002 | Lanham et al. ............. 702/185 |
| 6,433,310 B1 * | 8/2002 | Wickramasinghe et al. . 219/216 |
| 6,831,807 B2 | 12/2004 | Koso et al. |
| 7,023,647 B2 | 4/2006 | Bloodworth et al. |
| 7,061,706 B2 * | 6/2006 | Conteras et al. ............... 360/75 |
| 7,068,458 B2 * | 6/2006 | Huang et al. ................... 360/75 |
| 7,068,468 B2 * | 6/2006 | Kamijima ................... 360/128 |
| 7,088,545 B1 * | 8/2006 | Singh et al. ................... 360/75 |
| 7,362,544 B2 | 4/2008 | Shiramatsu et al. |
| 7,375,912 B2 * | 5/2008 | Brannon et al. ............... 360/75 |
| 7,382,562 B2 * | 6/2008 | Emo et al. ..................... 360/46 |
| 7,385,778 B2 * | 6/2008 | Kakiki ......................... 360/75 |
| 2003/0099054 A1 * | 5/2003 | Kamijima ..................... 360/59 |
| 2004/0075940 A1 * | 4/2004 | Bajorek et al. .............. 360/110 |
| 2004/0114268 A1 * | 6/2004 | Satoh et al. ................... 360/75 |
| 2004/0190175 A1 * | 9/2004 | Chey et al. .................... 360/59 |

(Continued)

FOREIGN PATENT DOCUMENTS

JP   2002-288954   10/2002

*Primary Examiner*—Dismery E Mercedes
(74) *Attorney, Agent, or Firm*—Mahamedi Paradice Kreisman LLP; Christopher J. Brokaw (57) ABSTRACT

Embodiments in accordance with the present invention reduce the number of errors caused by the aged deterioration of a heater for adjusting the clearance between a head and a disk. According to one embodiment, a thermal fly height control (TFC) controller executes the measurement of a resistance value of a heater in a predetermined timing. The TFC controller judges whether or not the measured resistance value falls within a predetermined reference range. If the measured resistance value falls within the reference range, the processing ends without performing any other processing. If the measured resistance value goes out of the reference range, the TFC controller executes error handling processing in response to a resistance failure. As one of the error handling processing, the TFC controller notifies the host that the abnormality (resistance failure) has been detected in the resistance value of the TFC heater.

20 Claims, 8 Drawing Sheets

U.S. PATENT DOCUMENTS

| | | | |
|---|---|---|---|
| 2005/0057841 A1* | 3/2005 | Stover et al. | 360/59 |
| 2005/0105204 A1* | 5/2005 | Bloodworth et al. | 360/75 |
| 2005/0128630 A1* | 6/2005 | Huang et al. | 360/75 |
| 2005/0201001 A1* | 9/2005 | Conteras et al. | 360/75 |
| 2005/0213143 A1 | 9/2005 | Cook et al. | |
| 2005/0213243 A1* | 9/2005 | Huang et al. | 360/75 |
| 2006/0039077 A1 | 2/2006 | Xu et al. | |
| 2006/0268445 A1* | 11/2006 | Brannon et al. | 360/75 |
| 2007/0230019 A1* | 10/2007 | Song et al. | 360/75 |
| 2007/0230020 A1* | 10/2007 | Leis | 360/75 |
| 2007/0268609 A1* | 11/2007 | Kakiki | 360/75 |

* cited by examiner

DISK DRIVE AND CONTROL METHOD THEREOF

CROSS-REFERENCE TO RELATED APPLICATION

The instant nonprovisional patent application claims priority to Japanese Application No. 2006-120688 filed Apr. 25, 2006 and incorporated by reference in its entirety herein for all purposes.

BACKGROUND OF THE INVENTION

Devices using various types of media such as optical disks, magnetic optical disks, and a flexible magnetic disk are known in the art as disk drives. Among them, hard disk drives (hereinafter referred to as HDDs) have become popular as storage devices for computers to such an extent that they are one of the storage devices indispensable for today's computer systems. Further, not limited to the computers as described above, HDDs are expanding more and more in application due to their excellent properties. For example, HDDs are used for moving picture recording/reproducing devices, car navigation systems, cellular phones, and removable memories for use in digital cameras.

A magnetic disk used in the HDD has a plurality of data tracks that are concentrically formed. A plurality of pieces of servo data each having address information, and a plurality of data sectors each including user data, are written to each data track. A plurality of data sectors are written between servo data areas. By accessing, according to the address information of the servo data, a desired data sector by use of a head element of a head slider supported by an actuator that pivotally moves, it is possible to write data to the data sector or to read data from the data sector.

In order to improve the recording density of a magnetic disk, it is important to reduce the clearance between the magnetic disk and a head element flying above the magnetic disk. For this reason, some mechanisms for adjusting the clearance have been proposed. In one example of the proposed mechanisms, a head slider includes a heater, and the clearance is adjusted by heating a head element by use of the heater. In this specification, this is called TFC (Thermal Fly height Control). According to the TFC, an electric current is supplied to a heater to generate heat, which causes a head element to protrude. This makes it possible to reduce the clearance between a magnetic disk and the head element. The TFC is disclosed in, for example, United States Patent Publication No. 20050213243 ("patent document 1"). Patent document 1 discloses that a resistance value of a heater element, which changes in response to the temperature, is measured to adjust the output to the heater element so as to compensate for the heater power in response to the value.

If the TFC is adopted, a heater is repeatedly turned ON/OFF several trillions of times during the use of the HDD. Because of this, the long-term reliability of the TFC becomes a major concern. As a result of the study of the inventors, it has been found that if a heater is repeatedly turned ON/OFF by TFC, the thermal expansion and thermal shrinkage cause metal fatigue of materials of the heater, and consequently the breakage of the heater, and a short circuit by electromigration, may occur. In addition, in the boundary between the heater and a surrounding member thereof, a crack may occur due to the difference in material between them. Therefore, it is required to correctly detect or estimate the aging of the heater element, and to perform processing in response to the detection or estimation.

BRIEF SUMMARY OF THE INVENTION

An object of the present invention is to reduce the number of errors caused by the aged deterioration of a heater for adjusting the clearance between a head and a disk. According to the particular embodiments shown in FIGS. 2 and 3 of the present invention, a TFC controller 231 executes the measurement of a resistance value of a heater 124 in a predetermined timing. The TFC controller 231 judges whether or not the measured resistance value falls within a predetermined reference range. If the measured resistance value falls within the reference range, the processing ends without performing any other processing. If the measured resistance value goes out of the reference range, the TFC controller 231 executes error handling processing in response to a resistance failure. As one of the error handling processes, the TFC controller 231 notifies the host 51 that the abnormality (resistance failure) has been detected in the resistance value of the TFC heater 124 (ALERT).

DETAILED DESCRIPTION OF THE INVENTION

Embodiments of the present invention relate to a disk drive and a control method thereof, and more particularly to the heater control of a disk drive that is equipped with a heater for adjusting the clearance between a head element and a disk.

According to one aspect of embodiments in accordance with the present invention, there is provided a disk drive comprising: a slider that flies above a rotating disk; a head element located at the slider; a heater that uses thermal expansion to cause the head element to protrude so that the clearance between the head element and the disk is adjusted, the heater being located at the slider; a measurement circuit for measuring a resistance value of the heater in a predetermined timing; and a controller for referring to the measured resistance value to judge whether or not a resistance failure of the heater has occurred, and for performing, if it is judged that a resistance failure has occurred, error handling processing in response to the resistance failure. A resistance value of the heater is monitored; and if it is judged that a resistance failure has occurred, error handling processing in response to the resistance failure is carried out. This makes it possible to reduce the number of resistance errors caused by the aged deterioration of the heater. As one preferable example, in the error handling processing, the controller notifies a host of the resistance failure of the heater. This makes it possible to perform processing in response to the aging of the heater on the host side.

It is desirable that in the error handling processing, the controller check user data that has been written by the head element. If the aging of the heater causes the clearance to increase, it is possible to reduce the number of data write errors. In addition, if the detected temperature of the temperature sensor is lower than or equal to the reference temperature, the controller checks user data that has been written by the head element. This makes it possible to reduce the number of data write errors while the decrease in performance is suppressed. Moreover, in the case where the heater is being constant-current driven, if the resistance value of the heater decreases below a reference range, the controller checks user data that has been written by the head element. In another case, when the heater is being constant-voltage driven, if the resistance value of the heater increases above a reference range, the controller checks user data that has been written by the head element.

As one preferable example, in the error handling processing, the controller increases the frequency of measuring a resistance value of the heater. This makes it possible to more reliably detect the aging of the heater thereafter. In the error handling processing, the controller decreases the slew rate of a signal to be output to the heater. This makes it possible to reduce the aging of the heater.

It is desirable that if the resistance value of the heater is changed by 10% or more of a predetermined value, the controller may judge that a resistance failure of the heater has occurred. This makes it possible to more reliably prevent an error caused by open-circuit/short-circuit of the heater before it occurs.

It is desirable that the controller further refer to the read amplitude of the head element to judge whether or not a resistance failure of the heater has occurred. This makes it possible to make a resistance-failure judgment more correctly. In addition, if the resistance value of the heater goes out of a reference range, the controller carries out the error handling processing. Further, if the resistance value of the heater falls within the reference range, and if a change in read amplitude goes out of a reference value, the controller also carries out the error handling processing.

It is desirable that the controller further refer to an error rate of data read out by the head element to judge whether or not a resistance failure of the heater has occurred. This makes it possible to make a resistance-failure judgment more correctly. If the resistance value of the heater goes out of a reference range, the controller carries out the error handling processing. Further, if the resistance value of the heater falls within the reference range, and if a change in the error rate goes out of a reference value, the controller also carries out the error handling processing.

According to another aspect of embodiments in accordance with the present invention, there is provided a control method of a disk drive, the disk drive comprising: a slider that flies above a rotating disk; a head element located at the slider; and a heater that uses thermal expansion to cause the head element to protrude so that the clearance between the head element and the disk is adjusted, the heater being located at the slider. The control method comprises the steps of: measuring a resistance value of the heater in a predetermined timing; referring to the measured resistance value to judge whether or not a resistance failure of the heater has occurred; and if it is judged that a resistance failure of the heater has occurred, performing error handling processing in response to the resistance failure.

The resistance value of the heater is monitored; and if it is judged that a resistance failure has occurred, error handling processing in response to the resistance failure is carried out. This makes it possible to reduce the number of resistance errors caused by the aged deterioration of the heater.

According to embodiments of the present invention, it is possible to reduce the number of resistance errors caused by the aged deterioration of a heater for adjusting the clearance between a head and a disk.

Embodiments of the present invention will be described as below. To clarify the explanation, omission and simplification are made where appropriate in the following description and drawings. Also note that same reference numerals are used to designate same elements that are common to the figures, and that redundant description is omitted as appropriate for clarification of the explanation. As an example of disk drives, there are hard disk drives. Taking a hard disk drive (HDD) as an example, an embodiment of the present invention will described as below.

One of the characteristics of this embodiment is a judgment whether or not a resistance failure of a heater has occurred, and error handling processing to cope with the resistance failure, which are carried out in TFC (Thermal Fly height Control) of a disk drive. The TFC adjusts the clearance between a head element and a recording disk by thermal expansion that is caused by heat from a heater on a slider. The HDD according to this embodiment measures this resistance value of the heater. Then, if it is judged that the resistance failure has occurred, the HDD executes error handling processing therefor. This makes it possible to reduce the aging of the heater, or to reduce the number of errors in the case where TFC is not perfectly performed.

Figure 1:
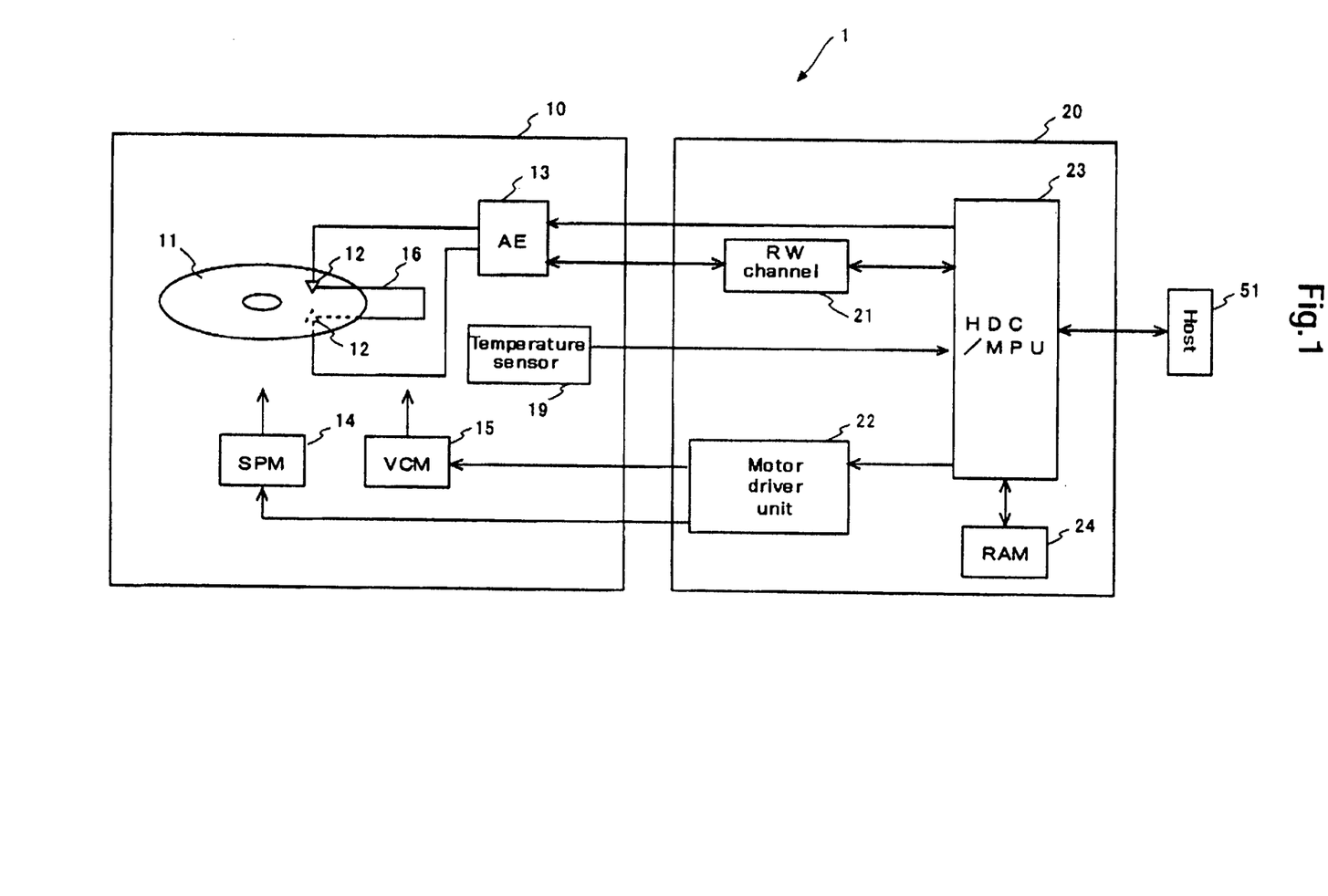
FIG. 1 is a block diagram schematically illustrating the entire configuration of a HDD according to embodiments of the present invention.

For easier understanding of the characteristics of this embodiment, first of all, an overall configuration of the HDD will be schematically described. FIG. 1 is a block diagram schematically illustrating an overall configuration of a HDD 1 according to this embodiment. As shown in FIG. 1, the HDD 1 includes a sealed enclosure 10, which houses: a magnetic disk 11 that is an example of a recording disk (recording medium); a head slider 12; arm electronics (AE) 13; a spindle motor (SPM) 14; a voice coil motor (VCM) 15; an actuator 16; and a temperature sensor 19.

The HDD 1 further includes a circuit board 20 that is secured outside the enclosure 10. On the circuit board 20, there are provided ICs including: a read/write channel (RW channel) 21; a motor driver unit 22; an integrated circuit 23 including a hard disk controller (HDC) and a MPU (hereinafter referred to as "HDC/MPU"); and a RAM 24. Incidentally, the above-described circuits can be integrated into one IC; or each circuit can be implemented by dividing the circuit into a plurality of ICs. User data from an external host 51 is received by the HDC/MPU 23, and is sent through the RW channel 21 and the AE 13 before the user data is written to the magnetic disk 11 by the head slider 12. On the other hand, user data stored on the magnetic disk 11 is read out by the head slider 12. This user data is sent through the AE 13 and the RW channel 21, and is then output from the HDC/MPU 23 to the external host 51.

The magnetic disk 11 is secured to the SPM 14. The SPM 14 rotates the magnetic disk 11 at specified angular speed. The motor driver unit 22 drives the SPM 14 according to control data received from the HDC/MPU 23. The magnetic disk 11 according to this embodiment has recording surfaces on both sides. Data is written to each of the recording surfaces. Head sliders 12 are provided corresponding to each of the recording surfaces. Each head slider 12 includes: a slider that flies above the magnetic disk; and a head element that is secured to the slider, and that converts between a magnetic signal and an electric signal. The head slider 12 according to this embodiment includes a heater used for TFC in which heating causes the head element to protrude so that the clearance (flying height) between the head element and the magnetic disk 11 is adjusted. A structure of the head slider 12 will be described in detail later with reference to FIG. 2.

Each head slider 12 is secured to the tip of the actuator 16. The actuator 16 is connected to the VCM 15. The actuator 16 pivotally moves about a pivot shaft, which causes the head slider 12 to move in its radial direction above the magnetic disk 11. The motor driver unit 22 drives the VCM 15 according to control data (called DACOUT) that is received from the HDC/MPU 23. It is to be noted that the required number of the magnetic disks 11 is one or more, and that a recording surface can be formed on one side, or both sides, of the magnetic disk 11.

The AE 13 selects, from among the plurality of head elements 12, one head element 12 that is used to access the magnetic disk 11, and amplifies, at a constant gain, a read signal read by the selected head element 12, and then transmits the amplified signal to the RW channel 21. In addition, the AE 13 receives a write signal from the RW channel 21, and then transmits the write signal to the selected head element 12. Moreover, the AE 13 supplies an electric current (electric power) to the heater, and functions as an adjustment circuit for adjusting the amount of electric current.

In the read processing, the RW channel 21 amplifies a read signal supplied from the AE 13 so that the amplitude thereof is kept constant, and then extracts data from the obtained read signal to perform decode processing. Data which is read out includes user data and servo data. The read user data and the servo data, which have been decoded, are supplied to the HDC/MPU 23. Additionally, in the write processing, the RW channel 21 performs code modulation of write data supplied from the HDC/MPU 23, and then converts the code-modulated write data into a write signal to supply the write signal to the AE 13.

In the HDC/MPU 23, the MPU operates according to microcodes loaded into the RAM 24. When the HDD 1 is started up, not only the microcodes that operate on the MPU, but also data required for control and data processing, are loaded into the RAM 24 from the magnetic disk 11 or a ROM (not illustrated in the figure). The HDC/MPU 23 executes processing required for data processing such as read/write processing control, management of the command execution order, positioning control (servo control) of the head elements 12 by use of a servo signal, interface control, defect control, and ERP at the time of the occurrence of an error. The HDC/MPU 23 also executes the total control of the HDD 1. In particular, the HDC/MPU 23 according to this embodiment performs error handling processing when the measurement of the resistance of the heater, and a measured value thereof, in TFC indicates a resistance failure. This point will be described later.

Figure 2:
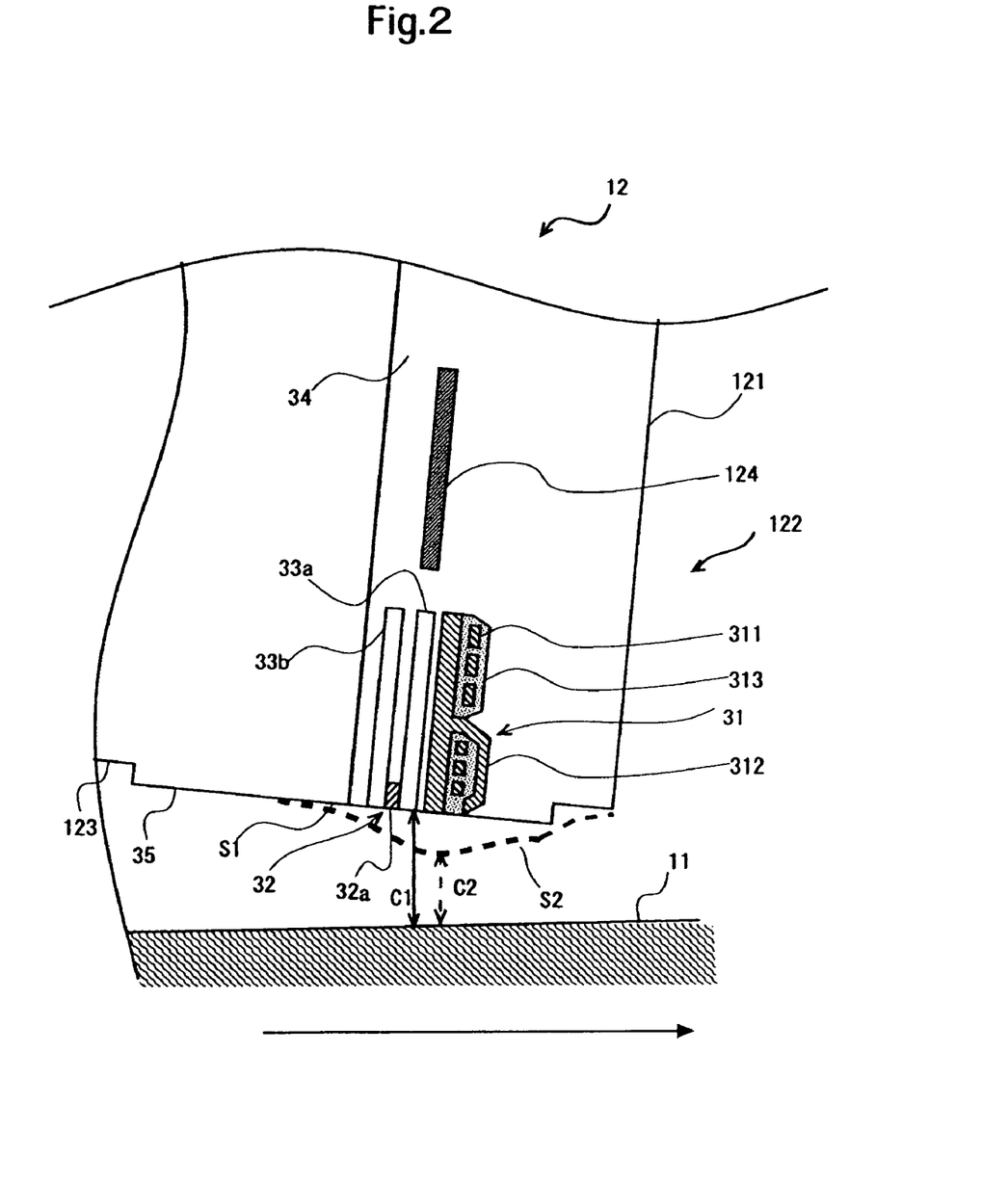
FIG. 2 is a cross section schematically illustrating a configuration of a head slider that is equipped with a heater used for TFC according to embodiments of the present invention.

Next, a configuration of a TFC head slider 12 according to this embodiment will be described. FIG. 2 is a cross section view of a partial area in proximity to an air-outflow end face (trailing-side end face) 121 of the head slider 12. The magnetic disk 11 rotates from left to right in FIG. 2. The head slider 12 includes a head element 122, and a slider 123 for supporting the head element 122. It is to be noted that the TFC according to this embodiment can be applied to both a HDD adopting perpendicular magnetic recording and a HDD adopting longitudinal magnetic recording.

The head element 122 writes/reads magnetic data to/from the magnetic disk 11. The head element 122 includes a read element 32, and a write element 31 existing on its trailing side. A magnetic field is generated between ends of a magnetic pole 312 by a current flowing through the write coil 311. The write element 31 is an inductive element for writing the magnetic data to the magnetic disk 11 by using the magnetic field. The read element 32 is a magnetoresistive element. The read element 32 includes a magnetoresistive element 32a having magnetic anisotropy. According to a resistance value that varies in response to a magnetic field from the magnetic disk 11, the read element 32 reads out magnetic data written to the magnetic disk 11.

By use of a thin-film formation process such as plating, sputtering, and polishing, the head element 122 is formed on an alumina titan carbide (AlTiC) substrate constituting the slider 123. The magnetoresistive element 32a is sandwiched between magnetic shields 33a and 33b. The write coil 311 is surrounded by an insulation film 313. In addition, the head element 122 is provided with a protective layer 34 (for example, made of alumina) around the write element 31 and the read element 32. Accordingly, the whole head element 122 is protected by the protective layer 34. At an area in proximity to the write element 31 and the read element 32, a heater 124 including a resistor made of a thin film is provided using a thin-film process. In this example, the heater 124 is formed in the head element 122 at a position opposite to the magnetic disk 11. It is possible to form the heater 124 in a manner that a thin-film resistor, which uses permalloy, has a meander-like shape with a gap being filled with alumina.

When the AE 13 applies an electric current (supplies the electric power) to the heater 124, heat of the heater 124 causes an area in proximity to the head element 122 to protrude and to be transformed. When the heater 124 is not heated, an ABS surface of the head slider 12 has a shape indicated with S1. The clearance, which is the distance between the head element 122 and the magnetic disk, is indicated with C1. FIG. 2 schematically illustrates, with a broken line, a protruding shape S2 found when the heater 124 is heated. When the head element 122 approaches to the magnetic disk 11, the clearance C2 is smaller than the clearance C1. Incidentally, FIG. 2 is a conceptual diagram, and accordingly the dimensional relationship is not to scale. For example, the shape of the protruding surface S2 corresponds to the amount of protrusion in the order of nm (several nanometers).

The head element 122 is repeatedly expanded by the TFC. As a result, the thermal expansion and the thermal shrinkage may cause metal fatigue of materials of the heater 124. Accordingly, a breakage of the heater 124, and a short circuit by electromigration, may occur. In addition, in the boundary between the heater 124 and a surrounding member thereof, a crack may occur due to the difference in material between them. If the heater 124 is open-circuited/short-circuited, the HDD 1 cannot execute the TFC, which hinders user data from being read/written. Therefore, before the heater 124 is open-circuited/short-circuited, the HDD 1 is requested to detect that there is a tendency for the heater 124 to become abnormal, and to perform processing in response to the tendency.

The HDD 1 according to this embodiment measures a resistance value of the heater 124 in the predetermined timing. If the resistance value indicates a predetermined failure resistance value, the HDD 1 executes error handling processing in response to the failure resistance value. To be more specific, as shown in a block diagram of FIG. 3, a TFC controller 231 controls the measurement of a resistance value of the heater 124, and also controls the execution of the error handling processing in the case where the resistance value indicates an error.

Figure 3:
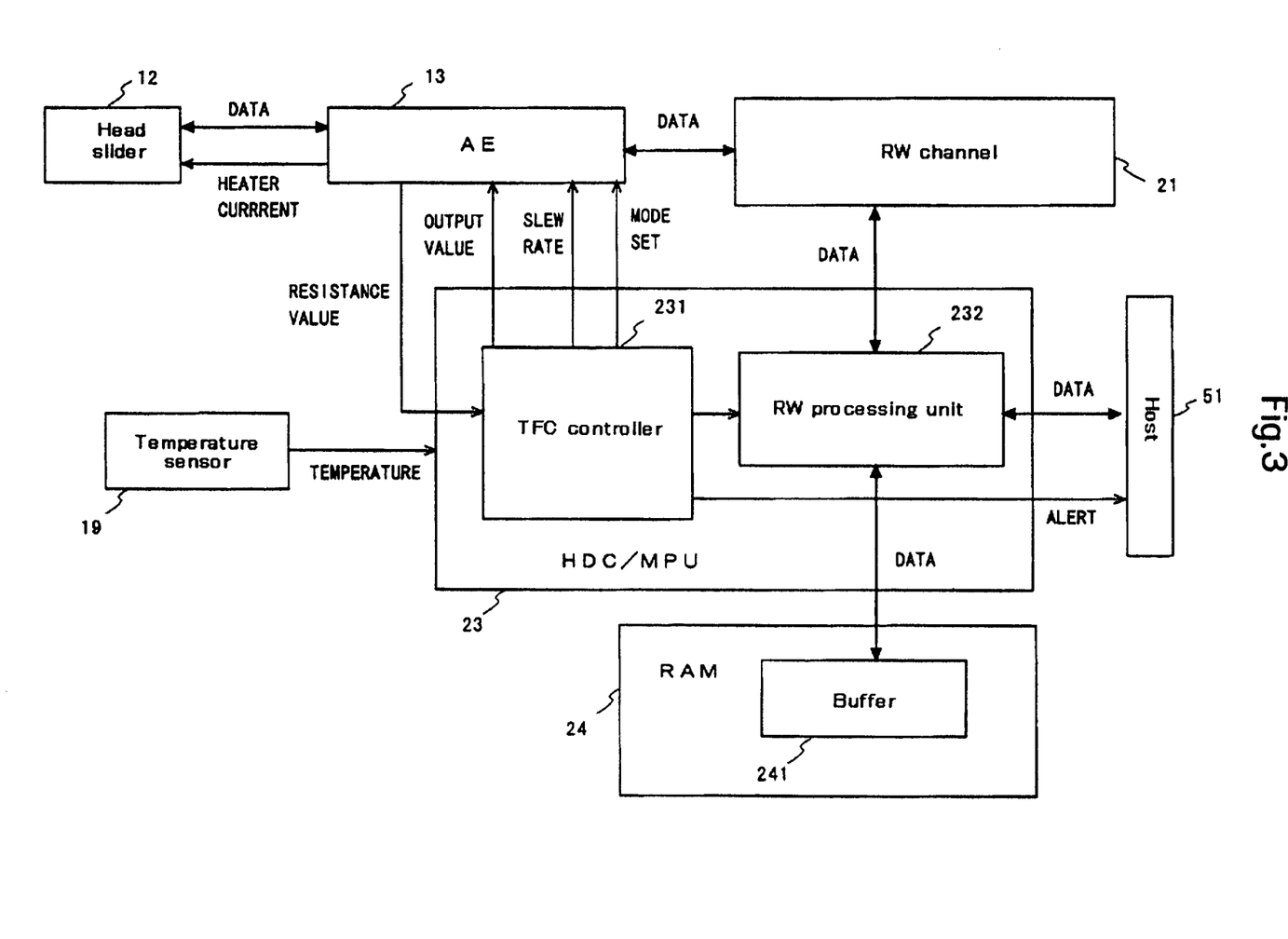
FIG. 3 is a block diagram schematically illustrating functional elements according to an embodiment, the functional elements relating to the measurement of a resistance value of a TFC heater, and relating to, in the case where the resistance value indicates an error, error handling processing in response to the error.

By using the MPU which operates according to microcodes so that the MPU functions as the TFC controller 231, or by using part of a hardware circuit included in the HDC/MPU 23 and the MPU operating according to microcodes in combination, it is possible to implement the TFC controller 231. In addition, the HDC/MPU 23 functions as a RW processing unit 232. Typically, the combination of part of the hardware circuit included in the HDC/MPU 23 and the MPU operating according to microcodes functions as the RW processing unit 232.

The TFC controller 231 totally controls the TFC in the HDD 1. To be more specific, according to the detected temperature (TEMPERATURE) detected by the temperature sensors 19 such as a thermistor, the TFC controller 231 sets in a register of the AE 13 an output value (OUTPUT VALUE) to be output to the heater 124. The AE 13 includes a driving circuit for driving the heater 124, and supplies the heater 124 with the output (HEATER CURRENT) of the set output value. Typically, the AE 13 constant-current or constant-voltage drives the heater 124. More specifically, the AE 13 supplies the heater 124 with a constant electric current or voltage that has been set by the TFC controller 231. Besides them, the AE 13 may drive the heater 124 so that the output becomes the constant electric power. Incidentally, the output to the heater 124 is changed not only by the temperature, but also by read/write processing.

The TFC controller 231 performs the measurement of a resistance value of the heater 124 in the predetermined timing. To be more specific, the AE 13 includes a measurement circuit for measuring a resistance value of the heater 124. The TFC controller 231 sets (MODESET) the AE 13 in a test mode in the specified timing, and instructs the measurement of a resistance value of the heater 124. By storing setting data in a control register of the AE 13, the TFC controller 231 requests the AE 13 to measure a resistance value. In response to the request received from the TFC controller 231, the AE 13 measures the resistance value of the heater 124.

As a preferable example of the timing in which a resistance value of the heater 124 is measured, the TFC controller 231 measures a resistance value at the time of power-on reset (POR) at which the HDD 1 is powered on. In another case, the TFC controller 231 measures the operating time during which the HDD 1 operates. When the measured operating time reaches the predetermined time, it is possible to start the measurement of a resistance value of the heater 124. Besides them, the TFC controller 231 may measure a resistance value with reference to the operating time in a specific temperature area.

The TFC controller 231 can measure each heater resistance value of the head sliders 12 concurrently or in the timing that differs from one another. For example, the TFC controller 231 measures the operating time of each head slider 12. When each operating time reaches the predetermined set time, the TFC controller 231 only measures a resistance value of a heater of the head slider 12 in question.

Figure 4:
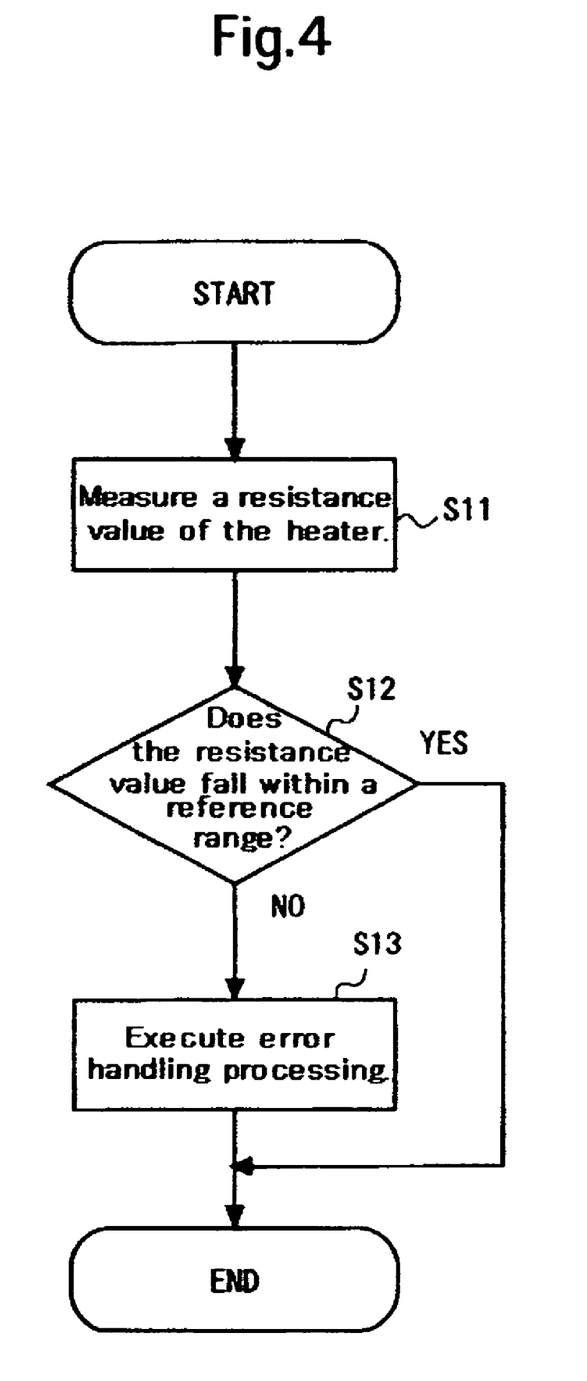
FIG. 4 is a flowchart illustrating the case where a resistance-failure judgment is made with reference to a measured resistance value of the TFC heater according to the embodiments of the present invention.

Referring to a flowchart shown in FIG. 4, the AE 13 measures a resistance value of the heater 124, and then stores the measured value in its own register (S11). The TFC controller 231 accesses the register of the AE 13 to obtain the measured value (RESISTANCE VALUE) of the resistance of the heater. The TFC controller 231 judges whether or not the obtained measured value of the resistance falls within the predetermined reference range (S12). If the measured resistance value falls within the reference range (YES in S12), the processing ends without performing any other processing. If the measured resistance value goes out of the reference range (NO in S12), the TFC controller 231 executes error handling processing in response to the resistance failure (S13).

As one example of the error handling processing, the TFC controller 231 notifies the host 51 that the abnormality (resistance failure) has been detected in the resistance value of the TFC heater 124 (ALERT). For example, the TFC controller 231 stores data indicating the detection of the resistance failure, and data indicating a state thereof, in the register included in the HDC/MPU 23. By referring to the register in a specified timing, the host 51 can detect that the abnormality in the resistance of the heater has occurred.

If a resistance value of the heater 124 is changed by 10% or more of the initial resistance value, the TFC controller 231 judges that a resistance failure has occurred. Preferably, as a reference for judging whether or not a resistance failure has occurred, from the viewpoint of preventing an error caused by the resistance failure before it occurs, if the measured value is changed by 5% or more of the initial resistance value, the TFC controller 231 judges that a resistance failure has occurred. It is to be noted that the measured value or the initial value may also be corrected or changed in response to the detected temperature of the temperature sensor 19.

Figure 5:
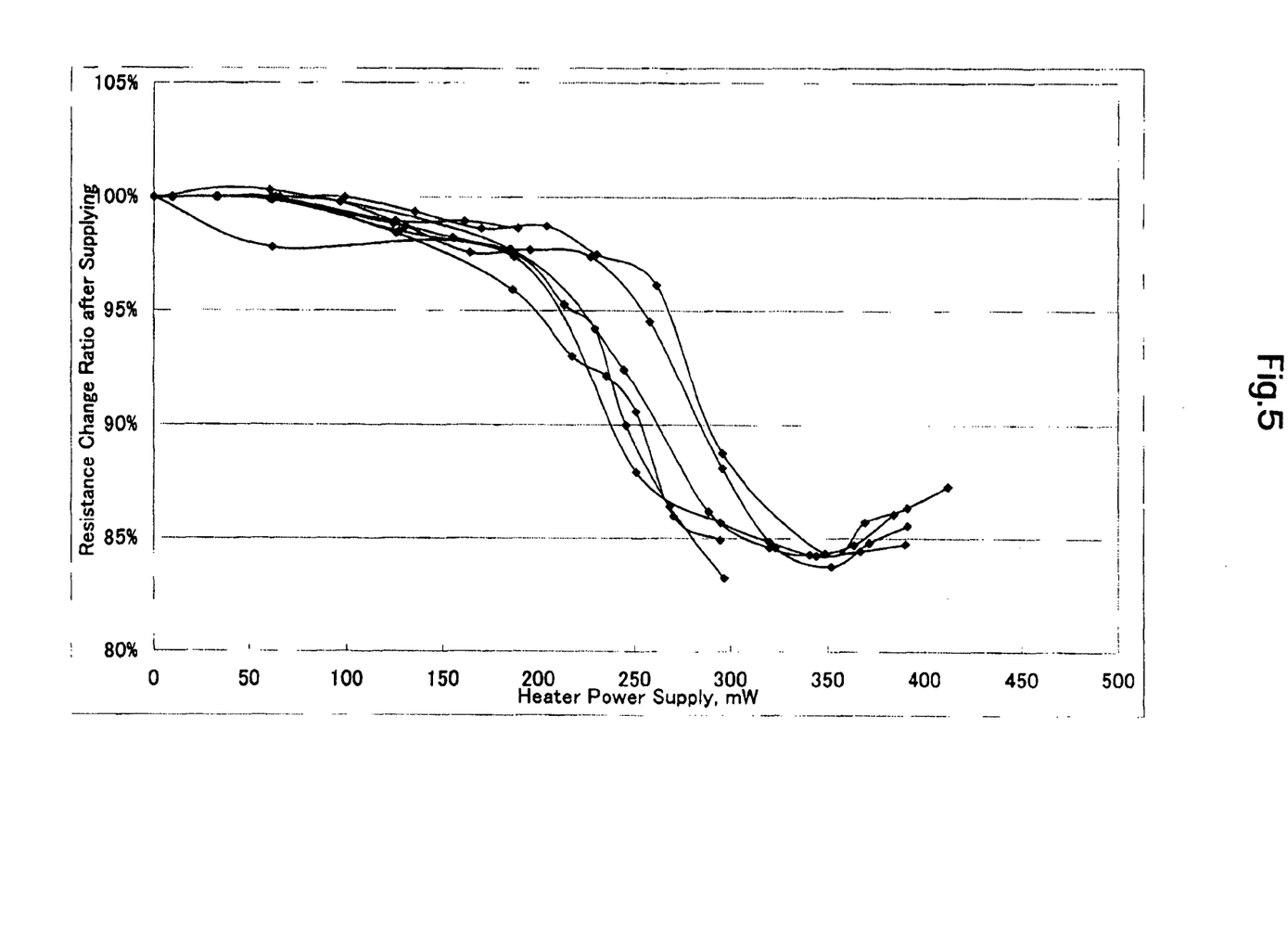
FIG. 5 is a graph illustrating an actual measured value of the resistance of the heater with respect to each value of the heater power according to the embodiments of the present invention.

FIG. 5 is a graph illustrating actual measured values of the resistance of the heater. Acceleration tests are performed for a plurality of head sliders to measure a change in resistance value of the heater 124. To be more specific, as shown in FIG. 5, while the power supplied to the heater 124 is gradually increased, each resistance value of the heater 124 corresponding to the supplied power is measured. The measurement is performed for the plurality of head sliders.

As understood from the graph shown in FIG. 5, on the assumption that each initial value is 100%, the resistance value gradually decreases up to 95%. After that, the resistance value suddenly changes from 95% to 85%. If the resistance value decreases to 85%, there exists a failure mode in which breakage of wire causes the resistance value to become infinite. Therefore, in an area in which the resistance value decreases to 90% or less of the initial resistance value, it is desirable that the TFC controller 231 judge the resistance value to be a resistance failure, and accordingly give a warning to the host 51. In addition, in order to increase the reliability, in an area in which the resistance value decreases to 95% or less where a resistance value starts suddenly changing, it is desirable that at least the TFC controller 231 judge the resistance value to be a resistance failure.

Incidentally, each resistance value is judged to be a resistance failure at least when the resistance value is a range of 90% or less, or 95% or less, of the initial value. Therefore, for example, it may also be so configured that the reference value is set to 97%, and that a resistance value in a range of 97% or less is judged to be a resistance failure. However, in order to avoid a warning from being frequently given, it is important that the reference value is not too large. Therefore, with a reference value set to 90% or 95%, the TFC controller 231 can compare a measured resistance value with the reference value, and if the measured resistance value is smaller than or equal to the reference value, it is judged that a resistance failure has occurred.

As one preferable example of the error handling processing, the frequency of measuring a resistance value of the heater 124 is increased. The TFC controller 231 shortens time intervals of measuring a resistance value, or starts measurement in the timing that has not yet been used in the past. For example, if the TFC controller 231 performs measurement at intervals of the prescribed operating time before the failure judgment, the TFC controller 231 performs the measurement also in POR after the failure judgment, or shortens the prescribed operating time used for the measurement. This makes it possible to reduce a possibility that a sudden change in resistance value will be overlooked thereafter.

Another preferable example of the error handling processing relates to control over the slew-rate of a signal to be output to the heater 124. In order to reduce the aging of the heater 124, it is desirable to decrease the slew rate of a signal to be output to the heater 124. The slew rate corresponds to the rising speed of the output signal from the AE 13 to the heater 124, or to the falling speed thereof. At a high slew rate, the rising or falling edge of electric current and voltage supplied to the heater 124 is fast. On the other hand, at a low slew rate, the rising or falling edge of electric current and voltage supplied to the heater 124 is slow.

To be more specific, a slew rate can be expressed with the time from when the change in output from the AE 13 to the heater 124 starts to when the change reaches a saturation value thereof. For example, at the rising edge of the constant current drive, it is possible to define a slew rate at the rising edge by use of the time from when the AE 13 starts supplying an electric current to when a value of the electric current reaches a saturation value thereof. Similarly, at the falling edge of the constant current drive, it is possible define a slew rate at the falling edge by use of the time from when an output current of the AE 13 starts decreasing to when a value of the output current reaches a saturation value thereof (in other words, the value reaches a 0 level). In the case of the constant voltage drive, it is possible to define the slew rate by use of a voltage value thereof.

As shown in FIG. 3, if it is judged that a resistance failure has occurred, the TFC controller 231 sets a lower slew rate value (SLEW RATE) in a setting register of the AE 13. The AE 13 outputs an electric current/voltage to the heater 124 at the slew rate based on the settings. By decreasing the slew rate, it is possible to reduce the aging of the heater 124.

In another case, it is desirable to perform write-and-verify processing in the error handling processing under specified conditions. In the write-and-verify processing, after user data is written to a recording surface of the magnetic disk 11, a check is made as to whether or not the user data has been correctly written. In addition to a notification (warning) transmitted to the host 51, or without transmitting the notification, the HDC/MPU 23 performs the write-and-verify processing.

When a resistance value of the heater 124 is changed, the amount of protrusion of the head element 122 is changed depending on a driving method of the heater 124. To be more specific, in the case of the constant current drive, a decrease in resistance value causes the heater power to decrease, which results in a decrease in the amount of protrusion. On the other hand, in the case of the constant voltage drive, an increase in resistance value causes the heater power to decrease, which results in a decrease in the amount of protrusion. Therefore, it is desirable that under these error conditions of each of the driving methods, the HDC/MPU 23 perform write-and-verify processing.

To be more specific, referring to FIG. 3, if it is judged that a resistance failure has occurred, the TFC controller 231 notifies the read/write processing unit (RW processing unit) 232 of the result of the judgment. The RW processing unit 232 controls and executes processing of reading/writing user data. In the write processing, the RW processing unit 232 temporarily stores the user data (DATA) obtained from the host 51 in a buffer 241 included in the RAM 24. After that, the RW processing unit 232 extracts the user data from the buffer 241, and then transmits the user data to the RW channel 21. The data which has been transmitted to the RW channel 21 is transmitted to the head slider 12 through the AE 13. The head slider 12 then writes the data at a target address (sector). In the read processing, the RW processing unit 232 stores the user data obtained from the RW channel 21 in the buffer 241. After that, the RW processing unit 232 extracts the user data from the buffer 241, and then transmits the user data to the host 51.

The RW processing unit 232, which has been notified of the resistance failure, performs the write-and-verify processing under predetermined conditions. It is desirable that if the temperature detected by the temperature sensor 19 is lower than or equal to the predetermined reference temperature, the write-and-verify processing may be performed. This is because in the low temperature area, there may be a shortage of data writing, in particular, poor overwriting is likely to occur in the early stage of writing, whereas the write-and-verify processing may lead to a decrease in performance of the HDD 1.

In the write-and-verify processing, the RW processing unit 232 writes user data to the magnetic disk 11, and then reads out the written data by the head element 12. The RW processing unit 232 compares read data obtained from the RW channel 21 with data stored in the buffer 241 to check whether or not the user data has been correctly written to the magnetic disk 11. If the user data has not been correctly written, the RW processing unit 232 executes the write processing again. Incidentally, data to be actually read out from the magnetic disk 11 is all or part of the written data. Because many errors occur in the early stage of writing, the writing judgment may also be made by comparing only part of data that has been written in the early stage. It is to be noted that the write-and-verify processing may also be performed irrespective of the environmental temperature.

In contrast to the change in resistance described above, in the case of the constant current drive, an increase in resistance value causes the heater power to increase, which results in an increase in the amount of protrusion. On the other hand, in the case of the constant voltage drive, a decrease in resistance value causes the heater power to increase, which results in an increase in the amount of protrusion. Therefore, under these resistance error conditions of each of the driving methods, it is desirable that a value of a current or voltage to be supplied to the heater 124 be reduced. Incidentally, if the resistance value is infinite (the resistance value is larger than or equal to the reference value), this means that an open state has occurred. Accordingly, the heater 124 does not function. Therefore, even in this case, it is desirable to perform the write-and-verify processing as described above.

In the above example, the TFC controller 231 refers to only a measured resistance value to determine whether or not the error handling processing should be executed. However, the reference to not only the measured value, but also other conditions, is one of the preferable modes. In one of the preferable modes, the TFC controller 231 refers to an error rate of the user data that has been read out.

Figure 6:
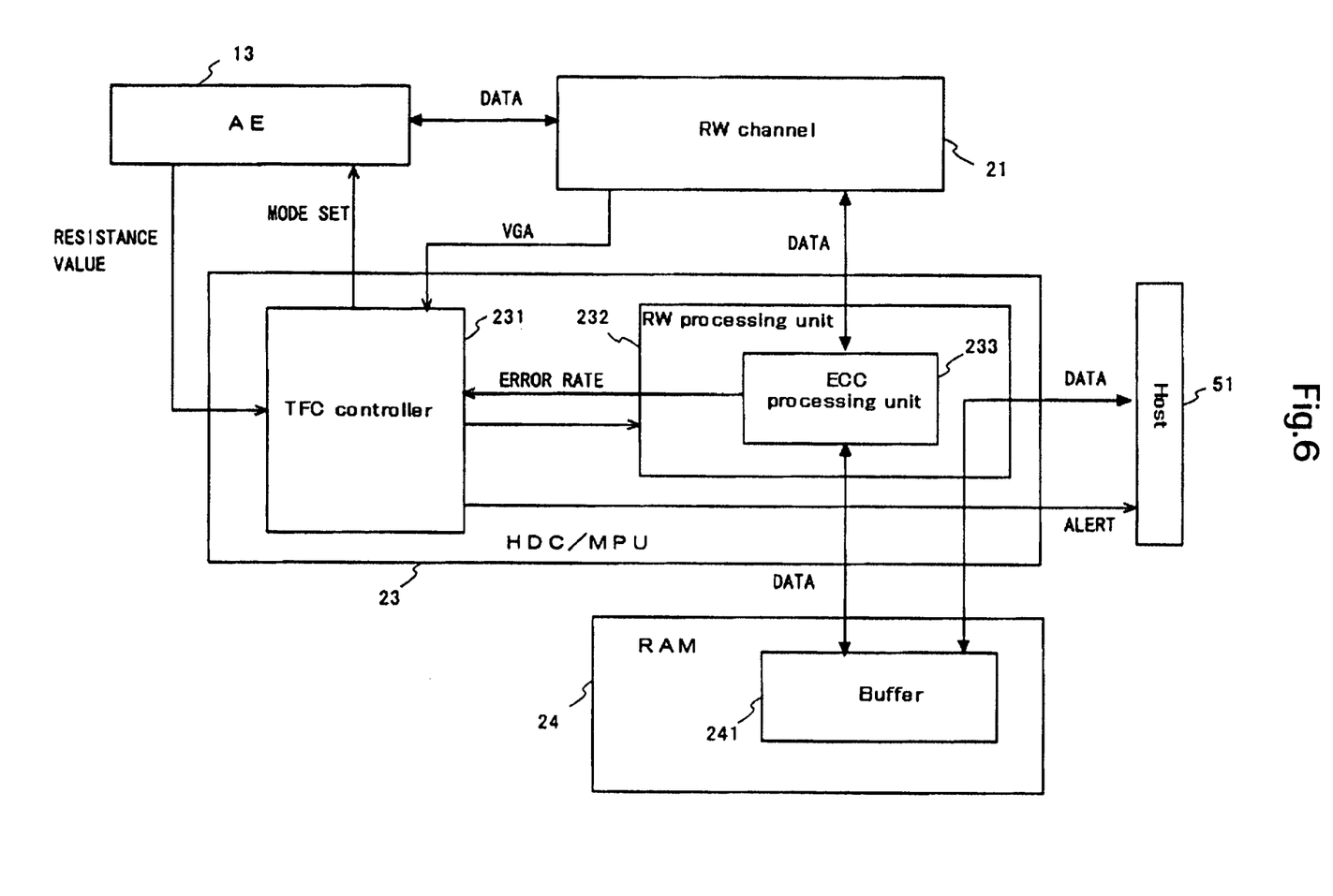
FIG. 6 is a block diagram schematically illustrating functional elements relating to the judgment of a resistance failure with reference to an error rate or the read amplitude according to the embodiments of the present invention.

As shown in a block diagram of FIG. 6, the ECC processing unit 233 included in the RW processing unit 232 executes ECC processing for user data. At the time of write processing, the ECC processing unit 233 adds ECC (Error Checking Code) to data received from the host 51. The data to which the ECC has been added is transmitted to the RW channel 21. In addition, at the time of read processing, the ECC processing unit 233 executes error correction processing by use of ECC of data transmitted from the RW channel 21, and then stores, in the buffer 241, data having being subjected to error correction processing.

In the error correction processing at the time of read processing, the ECC processing unit 233 counts an error rate, more specifically, the number of correction bits per codeword (the number of error bits). The TFC controller 231 acquires data indicating this error rate from the ECC processing unit, and then determines according to this data, whether or not the error handling processing should be executed. To be more specific, the TFC controller 231 identifies a change in error rate relative to an initial value of the error rate. Then, in response to the change, the TFC controller 231 determines whether or not the error handling processing should be executed. The initial value can be registered in the HDD 1, for example, in a manufacturing stage before shipment.

One embodiments of present invention will be described with reference to a flowchart shown in FIG. 7. The TFC controller 231 uses two reference ranges corresponding to each measured resistance value. For example, the TFC controller 231 defines a change in resistance value whose range is smaller than 5% as a first reference range. In addition, the TFC controller 231 defines a change in resistance value whose range is smaller than 2% as a second reference range. Here, the second reference range is narrower than the first reference range. Referring to FIG. 6, when the AE 13 measures a resistance value of the heater (S21), the TFC controller 231 judges whether the measured resistance value falls within the first reference range. In other words, the TFC controller 231 judges whether or not the measured resistance value has changed by 5% or more of an initial value (S22). If the resistance value has changed by 5% or more (NO in S22), the TFC controller 231 judges that error handling processing should be executed. Accordingly, the HDC/MPU 23 executes the error handling processing (S25).

If it is judged that the measured resistance value falls within the first reference range, in other words, if a change in resistance value is smaller than 5% (YES in S22), then the TFC controller 231 judges whether or not the measured resistance value falls within the second reference range (smaller than 2%) (S23). If the change in resistance value falls within the second reference range, in other words, if the change in measured resistance value is smaller than 2%, processing ends without performing the error handling processing (S25). This is because judging from this change, a measurement error or the heater 124 is thought to fall within a normal range.

If the change in resistance value does not fall within the second reference range, in other words, if the change in measured resistance value is 2% or more and smaller than 5%, the TFC controller 231 refers to an error rate. The TFC controller 231 identifies a change in error rate from the initial value, and then judges whether or not the extent to which the error rate has become worse is a predetermined reference value or more (S24). If the change in error rate falls within the reference range (YES in S24), the processing ends without performing the error handling processing (S25). If it is judged that the extent to which the error rate has become worse is larger than or equal to the reference value (NO in S24), the HDC/MPU 23 executes the error handling processing (S25).

As described above, by referring to not only the resistance value but also the error rate, it is possible to detect a resistance failure of the heater 124 more reliably and more accurately. In particular, by using a plurality of reference ranges for each resistance value, and by referring to an error rate in a moderate reference range, it is possible to prevent the heater 124 from being opened/short-circuited before it occurs. Incidentally, instead of using data that directly indicates an error rate or a change in error rate, the TFC controller 231 may also refer to an error rate by use of data that indirectly indicates the error rate. Moreover, the error rate or the reference ranges may also be corrected on the basis of temperature conditions. The undermentioned read amplitude of user data is also treated in the same manner.

As another preferable mode, the TFC controller 231 refers to not only a measured resistance value but also the read amplitude of the user data. By acquiring an amplitude value from the register of the AE 13, or by acquiring a gain value of VGA (Variable Gain Amplifier) (VGA shown in FIG. 6) from the RW channel 21, the TFC controller 231 can detect the read amplitude. The TFC controller 231 identifies whether or not a change in measured resistance value of the heater 124 is in the same direction as that of a change in read amplitude. If these changes are in the same direction, the TFC controller 231 judges that the error handling processing should be executed.

For example, in the case of the constant current drive, an increase in resistance of the heater means a decrease in clearance. Therefore, it is expected that the read amplitude will increase. On the other hand, a decrease in resistance of the heater means an increase in clearance. Therefore, it is expected that the read amplitude will decrease.

In the case of the constant voltage drive, an increase in resistance of the heater means an increase in clearance. Therefore, it is expected that the read amplitude will decrease. On the other hand, a decrease in resistance of the heater means a decrease in clearance. Therefore, it is expected that the read amplitude will increase. The TFC controller 231 compares, for example, an initial value of the read amplitude, which is registered in the manufacturing stage, with a measured value. As a result, the TFC controller 231 can identify a direction of the change, and the amount of the change.

In each of the heater driving methods, when a direction of a change in resistance of the heater is the same as that of the read amplitude, the TFC controller 231 judges that a resistance failure is occurring. Preferably, as is the case with the judgment in which an error rate is referred to, the TFC controller 231 has a plurality of reference ranges corresponding to each resistance value. In the judgment of a resistance value that falls within one of the ranges, the TFC controller 231 also refers to the read amplitude at the same time. A specific processing method will be described with reference to a flowchart shown in FIG. 8.

Figure 7:
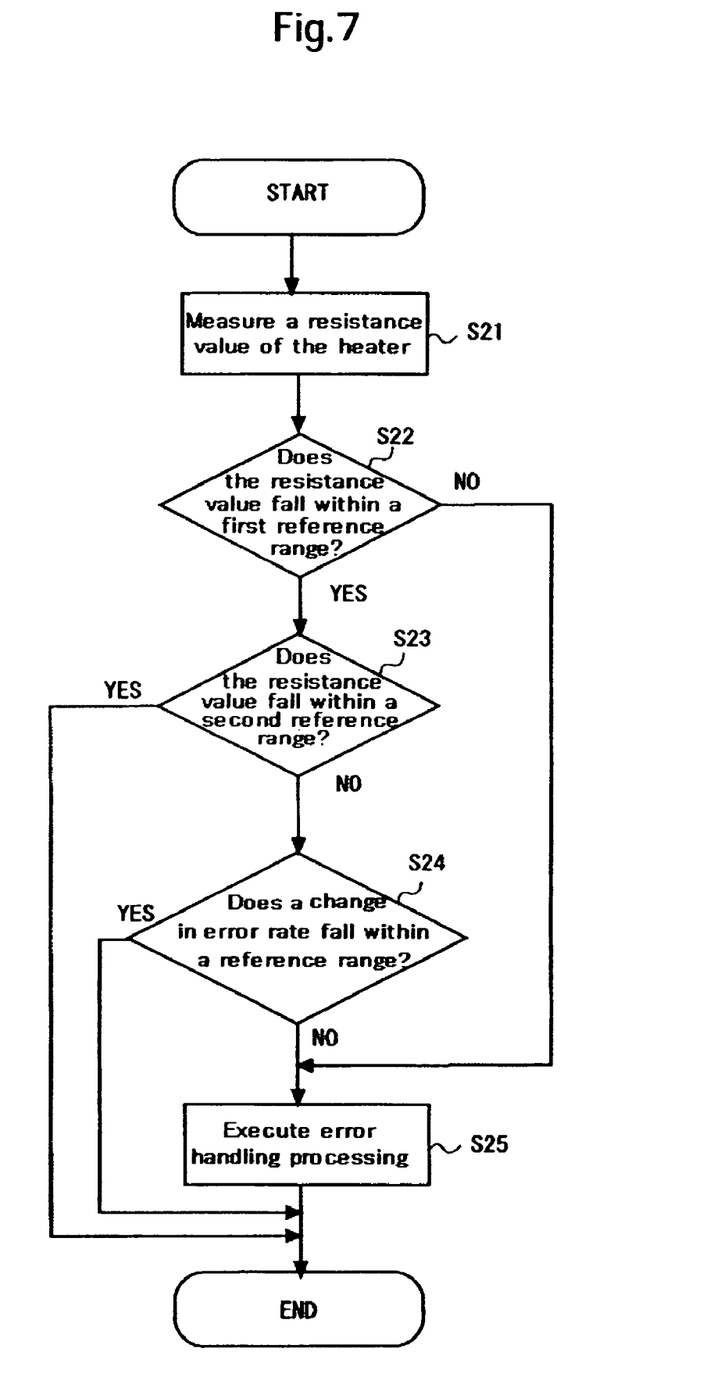
FIG. 7 is a flowchart illustrating the case where a resistance-failure judgment is made with reference to not only a measured resistance value but also an error rate of user data which has been read out according to the embodiments of the present invention.
Figure 8:
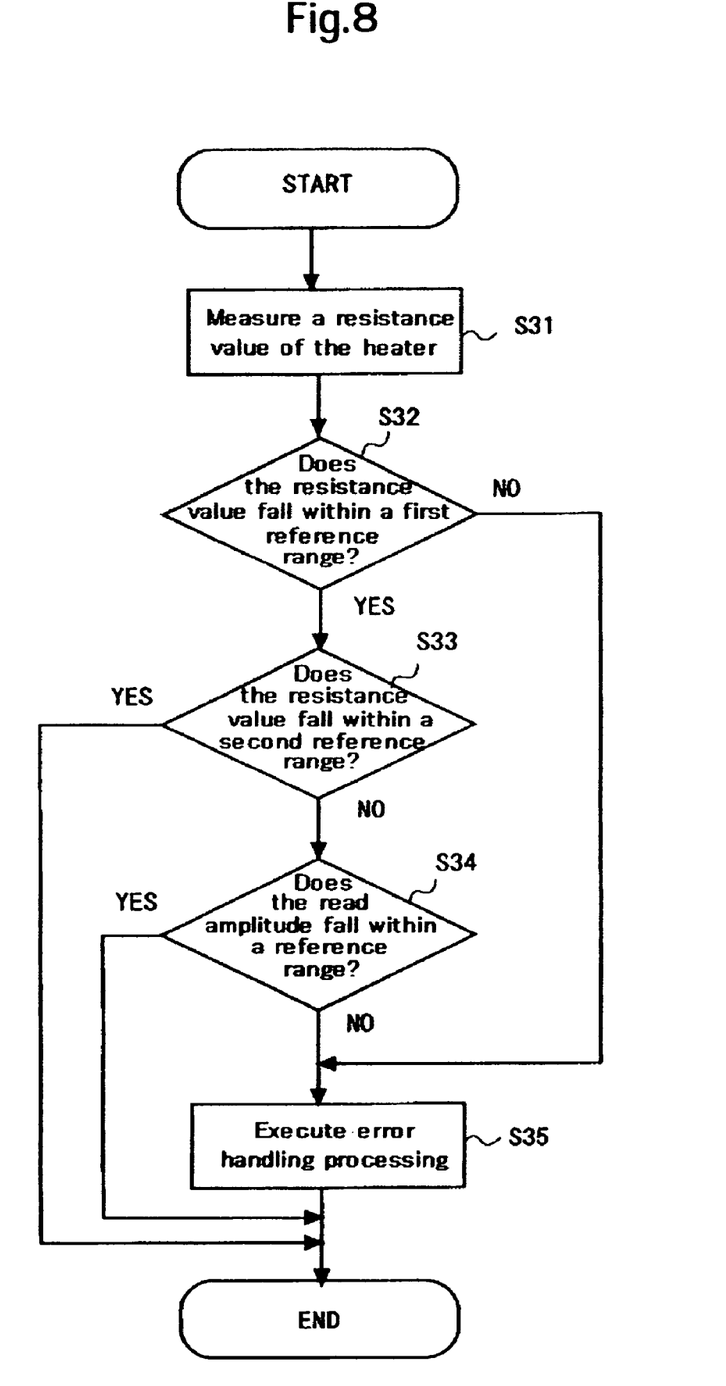
FIG. 8 is a flowchart illustrating the case where a resistance-failure judgment is made with reference to not only a measured resistance value but also the read amplitude of user data which has been read out according to the embodiments of the present invention.

In FIG. 8, processes from a step S31 to a step S33 are similar to those from the step S21 to the step S23 shown in FIG. 7. If a change in resistance value goes out of the second reference range (NO in S23), the TFC controller 231 refers to the read amplitude to judge whether or not the read amplitude falls within the reference range (S34). For example, the RW channel 21 acquires a VGA gain value, and then the TFC controller 231 compares the VGA gain value with an initial value to judge whether or not the change in VGA gain value falls within the reference range. As described above, the reference ranges vary depending on a driving method of the heater 124. In addition, depending on a direction of the change in resistance value, in other words, depending on whether the resistance value decreases or increases, the range varies. If the change in read amplitude falls within the reference range (YES in S34), the processing ends without performing the error handling processing. If the change in read amplitude goes out of the reference range (NO in S34), the HDC/MPU 23 executes the error handling processing (S35).

To be more specific, in the case of the constant current drive, when the resistance of the heater increases, if the read amplitude increases to or above a reference value, the TFC controller 231 judges that a resistance failure has occurred. On the other hand, when the resistance of the heater decreases, if the read amplitude decreases to or below a reference value, the TFC controller 231 judges that a resistance failure has occurred. In the case of the constant voltage drive, when the resistance of the heater increases, if the read amplitude decreases to or below a reference value, the TFC controller 231 judges that a resistance failure has occurred. On the other hand, when the resistance of the heater decreases, if the read amplitude decreases to or below a reference value, or if the read amplitude increases to or above a reference value, the TFC controller 231 judges that a resistance failure has occurred.

Up to this point, the present invention was described taking the particular embodiments as examples. However, the present invention is not limited to the above-mentioned embodiments. Those skilled in the art will be able to easily make modifications, additions and alterations to each element of the above embodiments within the scope of the preset invention. For example, it is also possible to apply each of the above-described examples of TFC to HDDs, each of which is equipped with a head slider that includes only a read element or a write element, or to disk drives other than HDDs.

What is claimed is:

1. A disk drive comprising:
a slider that flies above a rotating disk;
a head element located at the slider;
a heater that uses thermal expansion to cause the head element to protrude so that the clearance between the head element and the disk is adjusted, the heater being located at the slider;
a measurement circuit for measuring a resistance value of the heater in a predetermined timing; and
a controller for referring to the measured resistance value to judge whether or not a resistance failure of the heater has occurred, and for performing, if it is judged that a resistance failure has occurred, error handling processing in response to the resistance failure,
wherein in the error handling processing, the controller decreases the slew rate of a signal to be output to the heater.

2. The disk drive according to claim 1, wherein:
in the error handling processing, the controller notifies a host of the resistance failure of the heater.

3. The disk drive according to claim 1, wherein:
in the error handling processing, the controller checks user data that has been written by the head element.

4. The disk drive according to claim 3, further comprising a temperature sensor, wherein:
if a temperature detected by the temperature sensor is lower than or equal to a reference temperature, the controller checks user data that has been written by the head element.

5. The disk drive according to claim 3, wherein:
the heater is constant-current driven; and
if a decrease in resistance value of the heater goes out of a reference range, the controller checks user data that has been written by the head element.

6. The disk drive according to claim 3, wherein:
the heater is constant-voltage driven; and
if an increase in resistance value of the heater goes out of a reference range, the controller checks user data that has been written by the head element.

7. The disk drive according to claim 1, wherein:
in the error handling processing, the controller increases the frequency of measuring a resistance value of the heater.

8. The disk drive according to claim 1, wherein:
if the resistance to the heater is changed by 10% or more of a predetermined value, then the controller judges that a resistance failure of the heater has occurred.

9. The disk drive according to claim 1, wherein:
the controller further refers to the read amplitude of the head element to judge whether or not a resistance failure of the heater has occurred.

10. The disk drive according to claim 9, wherein:
if the resistance value of the heater goes out of a reference range, the controller performs error handling processing; and
if the resistance value of the heater falls within the reference range, and if a change in read amplitude goes out of a reference value, the controller performs the error handling processing.

11. The disk drive according to claim 1, wherein:
the controller further refers to an error rate of data read out by the head element to judge whether or not a resistance failure of the heater has occurred.

12. The disk drive according to claim 11, wherein:
if the resistance value of the heater goes out of a reference range, the controller performs error handling processing; and
if the resistance value of the heater falls within the reference range and a change in the error rate goes out of a reference value, the controller performs the error handling processing.

13. A control method of a disk drive, the disk drive comprising:
a slider that flies above a rotating disk;
a head element located at the slider; and
a heater that uses thermal expansion to cause the head element to protrude so that the clearance between the head element and the disk is adjusted, the heater being located at the slider,
the control method comprising the steps of:
measuring a resistance value of the heater in a predetermined timing;
referring to the measured resistance value to judge whether or not a resistance failure of the heater has occurred; and
if it is judged that a resistance failure of the heater has occurred, performing error handling processing in response to the resistance failure,
wherein in the error handling processing, the slew rate of a signal to be output to the heater is decreased.

14. A disk drive comprising:
a slider that flies above a rotating disk;
a head element located at the slider;
a heater that uses thermal expansion to cause the head element to protrude so that the clearance between the head element and the disk is adjusted, the heater being located at the slider;
a measurement circuit for measuring a resistance value of the heater in a predetermined timing; and
a controller for referring to the measured resistance value to judge whether or not a resistance failure of the heater has occurred, and for performing, if it is judged that a resistance failure has occurred, error handling processing in response to the resistance failure, wherein if the resistance to the heater is changed by 10% or more of a predetermined value, then the controller judges that a resistance failure of the heater has occurred.

15. The disk drive according to claim 14, wherein:

in the error handling processing, the controller notifies a host of the resistance failure of the heater.

16. The disk drive according to claim 14, wherein:

in the error handling processing, the controller checks user data that has been written by the head element.

17. The disk drive according to claim 16, further comprising a temperature sensor, wherein:

if a temperature detected by the temperature sensor is lower than or equal to a reference temperature, the controller checks user data that has been written by the head element.

18. The disk drive according to claim 16, wherein:

the heater is constant-current driven; and if a decrease in resistance value of the heater goes out of a reference range, the controller checks user data that has been written by the head element.

19. The disk drive according to claim 16, wherein:

the heater is constant-voltage driven; and if an increase in resistance value of the heater goes out of a reference range, the controller checks user data that has been written by the head element.

20. The disk drive according to claim 14, wherein:

in the error handling processing, the controller increases the frequency of measuring a resistance value of the heater.

* * * * *